US009800022B2

(12) United States Patent
Wang et al.

(10) Patent No.: US 9,800,022 B2
(45) Date of Patent: Oct. 24, 2017

(54) NO-FREEWHEELING ARC LIGHTNING PROTECTION GAP PROTECTING DEVICE

(71) Applicants: Jufeng Wang, Guangxi (CN); Yanlei Wang, Guangxi (CN)

(72) Inventors: Jufeng Wang, Guangxi (CN); Yanlei Wang, Guangxi (CN); Shimin Li, Guangxi (CN); Renbao Yan, Guangxi (CN); Yanlong Wu, Guangxi (CN); Yunglong Wang, Guangxi (CN)

(73) Assignee: Jufeng Wang (CN)

( * ) Notice: Subject to any disclaimer, the term of this patent is extended or adjusted under 35 U.S.C. 154(b) by 439 days.

(21) Appl. No.: 14/419,396

(22) PCT Filed: Dec. 17, 2012

(86) PCT No.: PCT/CN2012/001709

§ 371 (c)(1),
(2) Date: Feb. 3, 2015

(87) PCT Pub. No.: WO2014/047758

PCT Pub. Date: Apr. 3, 2014

(65) Prior Publication Data

US 2015/0194790 A1 Jul. 9, 2015

(30) Foreign Application Priority Data

Sep. 27, 2012 (CN) .......................... 2012 1 0371579

(51) Int. Cl.
*H02H 1/00* (2006.01)
*H01T 1/10* (2006.01)
(Continued)

(52) U.S. Cl.
CPC ................ *H01T 1/10* (2013.01); *H01T 1/08* (2013.01); *H01T 4/14* (2013.01)

(58) Field of Classification Search
CPC ................ H01T 1/10; H01T 1/08; H01T 4/14
(Continued)

(56) References Cited

U.S. PATENT DOCUMENTS 2,145,111 A * 1/1939 Duvoisin .................. H01T 1/10 174/141 R
4,091,259 A * 5/1978 Tanaka .................. B23K 9/007 219/137 R
2006/0213872 A1* 9/2006 Takasu ...................... H01T 4/14 218/22

FOREIGN PATENT DOCUMENTS

CN 202003781 A 10/2011
CN 102486954 A 6/2012
(Continued)

OTHER PUBLICATIONS

International Search Report for PCT/CN2012/001709 and English Translation.

*Primary Examiner* — Thienvu Tran
*Assistant Examiner* — Lucy Thomas
(74) *Attorney, Agent, or Firm* — Garcia-Zamor IP Law; Ruy M. Garcia-Zamor

(57) ABSTRACT

Disclosed is a no-freewheeling arc lightning protection gap protecting device, comprising a grounding-side arc extinguishing device, and a grounding-side fitting and a conducting wire-side fitting installed at two ends of a circuit insulator string via fixing devices. The grounding-side arc extinguishing device comprises a thunder and lightning pulse acquisition device, an insulating sealing shell, a gas generating device and an arc extinguishing chamber. The other end of the grounding-side fitting is equipped with a connecting fine pipe. The grounding-side arc extinguishing device also comprises a tubular earth electrode made of a nonmetal conductive material and an L-shaped earth electrode. One end of the L-shaped earth electrode is inlaid in
(Continued)

and connected with the connecting fine pipe on the grounding-side fitting via a Z-shaped connecting fitting, and the other end of the L-shaped earth electrode penetrates the thunder and lightning pulse acquisition device and is connected with the tubular earth electrode. One end of the nonmetal conductive material tubular earth electrode is internally inlaid in the arc extinguishing chamber, and the other end is connected with the insulating sealing shell. The device improves the electric power system stability and prolongs the service life of the electric power equipment such as transformer and breaker, and has low production and maintenance cost.

66 Claims, 5 Drawing Sheets

(51) Int. Cl.
*H01T 1/08* (2006.01)
*H01T 4/14* (2006.01)

(58) Field of Classification Search
USPC .......................................................... 361/123
See application file for complete search history.

(56) References Cited

FOREIGN PATENT DOCUMENTS

| | | |
|---|---|---|
| CN | 202796277 U | 3/2013 |
| JP | 3208212 A | 9/1991 |

* cited by examiner

NO-FREEWHEELING ARC LIGHTNING PROTECTION GAP PROTECTING DEVICE

TECHNICAL FIELD

The present invention relates to a gas arc extinguishing lightning protection protecting device, especially relates to a no-freewheeling arc lightning protection gap protecting device.

BACKGROUND ART

The main work of electric power department is lightning protection of electric power transmission line, and lightning disturbance is still one of the important factors that influence the safety of electric power grid. The impulse flashover, caused by electric power transmission line be struck by lightning, causes flashover of circuit insulator string, then produces great power frequency freewheeling and damages the insulator string and fitting, results in line accidents. Because of its limitation, the 'blocked' lightning protection which is used conventionally cannot absolutely solve the accidents caused by lightning. So in order to protect the electric power transmission line, the electric power department generally sets parallel protection gap or line-arrester on the line. However, in practice, the parallel protection gap and line-arrester have some obvious defects as following:

At first, when the electric power transmission line is struck by lightning, the parallel protection gap will be punctured preferentially by overvoltage caused by the lightning, and conduct the lightning current to earth, so as to protect the line and electrical appliance. However, because of the parallel protection gap lacks the capability of arc extinguishing, it cannot extinguish the power frequency freewheeling caused after the flashover of insulator string, arc burns in the protection gap for a long time, this will damage the insulator string, and even cause the electric power transmission line to disconnection, and the arc will erode electrode and weaken its protection performance at the same time. In the end, depending on circuit breaker to extinguish arc for the protection of electric power transmission line and appliance, this is a way that sacrifices trip-out rate and reliability of power support for low accident rate.

Then, line-arrester is expensive, and it has high costs of use and maintenance, large leakage current, short service life, frequent replacing, and the zinc oxide module used in line-arrester exists obvious skin effect when struck by lightning, the large electric current makes it explodes easily, consequently breakdown of line for a long time, this goes against the economical, safe and stable operation of electric network.

So people begin to study the above problems, for example, the inventor's patent applied before (Chinese patent number: 2011201046273), disclosed a 10-35 kV overhead transmission line constrained space gas injection arc extinguish lightning protection gap device which is suitable for 10-35 kV overhead transmission line, the device is parallel connection stalled at the two ends of circuit insulator string, the flashover voltage between protection gaps is lower than that of insulator string protected, so as to be preferentially punctured before the insulator string protected when the electric power transmission line is struck by lightning, when the electro-discharge occurs, which caused by puncture, thunder and lightning pulse acquisition device auto-induces lightning current signal and triggers high-speed spray gas generating device, the high-speed spray gas generating device instantly generates high-speed spray gas flow to intensively concuss the freewheeling arc in constrained space in the longitudinal direction, and make the freewheeling arc cooling and extinct. Another example (Chinese patent number: 2011200053246) disclosed a transmission line constrained space gas flow injection arc extinguish lightning protection gap device which is suitable for any voltage level. The device is parallel installed at the two ends of circuit insulator string, the flashover voltage between protection gaps is lower than that of insulator string protected, so as to be preferentially punctured before the insulator string protected when the electric power transmission line is struck by lightning, when the electro-discharge occurs, which caused by puncture, gas generating material which is in the constrained space is heated sharply by arc with high temperature, at the same time thunder and lightning pulse acquisition device acquire signal automatically and start spray gas generating device, the spray gas generating device instantly generates high-speed gas flow which strongly impacts on the flaming arc length-ways, cools it down and finally extinguishes it. The patents mentioned have achieved good effect in solving the above problems, however as to higher voltage level or larger short-circuit current arc, especially for the phenomenon that the direct current arc does not exist arc zero and the wire will be burned by arc, and protection gap electrode is easily burned by arc in a case where there is no arc extinguish gas capsule, in order to solve the problems, besides increase the power of arc extinguish gas capsule, we must give a method and principle that can weaken current arc, prevent wire from burning and prevent gap electrode from being burned by arc, so that it can achieve better effect on arc extinguishing, and improve the stability of power system. Therefore, a lightning protection gap protecting device with more reliable performance and wider range of application is in badly need on the market, the device can prevent the wire from being burned by arc even in a case where there is a phenomenon that the direct current arc does not exist arc zero.

SUMMARY OF INVENTION

In view of the disadvantage of existing technology, the aim of the present invention is to provide a no-freewheeling arc lightning protection gap protecting device, it can be used on overhead transmission line with any level of voltage, actively weaken the arc current, prevent line from breaking and gap electrode from burning, easily replace arc extinguishing device, reduce the trip-out rate and accident rate of power system be struck by lightning, improve reliability of power system, prolong the service life of electric appliance, for example transformer and circuit breaker.

In order to achieve the above objects, the present invention provides a no-freewheeling arc lightning protection gap protecting device, comprising a grounding-side arc extinguishing device, a grounding-side fitting and a conducting wire-side fitting, the grounding-side fitting and the conducting wire-side fitting being installed at two ends of a circuit insulator string, respectively, via fixing devices; the grounding-side arc extinguishing device being installed at one end of the grounding-side fitting; the grounding-side arc extinguishing device comprising a thunder and lightning pulse acquisition device, an insulating sealing shell, a gas generating device and an arc extinguishing chamber, the gas generating device is located inside the insulating sealing shell; the grounding-side arc extinguishing device further comprises a tubular earth electrode made of nonmetal conductive material, one end of the tubular earth electrode is internally embedded in the arc extinguishing chamber, the other end of the tubular earth electrode is connected with the insulating sealing shell; the other end of the grounding-side fitting is equipped with a connecting fine pipe; the grounding-side arc extinguishing device is inlaid in and connected with the connecting fine pipe located on the grounding-side fitting via a Z-shaped connecting fitting, the other end of the Z-shaped connecting fitting is connected with the tubular earth electrode via a connecting-line penetrating the thunder and lightning pulse acquisition device.

The grounding-side arc extinguishing device further comprises a L-shaped earth electrode made of nonmetal conductive material, one end of the L-shaped earth electrode is connected with the Z-shaped connecting fitting, the other end of L-shaped earth electrode penetrates the thunder and lightning pulse acquisition device and is connected with the tubular earth electrode.

Using the Z-shaped connecting fitting for inlaying connection, makes it possible to replace the arc extinguishing device easily. The device uses the tubular earth electrode made of nonmetal conductive material as one end for jointing the lightning arc, with its function, cylindrical arc will diffuse to the tubular earth electrode actively as soon as the lightning punctures the gap, making the high-temperature arc column disappears when it passes through the tubular earth electrode made of nonmetal conductive material, so as to effectively reduce the temperature of arc. The tubular earth electrode, which is made of nonmetal conductive material, uses cold cathode material, it can effectively reduce the degree of ionization of jointing point, and weaken the arc obviously. The thunder and lightning pulse acquisition device is a device which can acquire thunder and lightning pulse signal, that is the thunder and lightning pulse acquisition device can acquire the thunder and lightning pulse signal which through the L-shaped earth electrode when lightning happens. Both of the tubular earth electrode and the L-shaped earth electrode are made of nonmetal conductive material, they can be cast into one, or be two separate components, thereinto the shape of L-shaped earth electrode, which is made of nonmetal conductive material, is L-shape, for the L-shaped earth electrode and the tubular earth electrode in a close contact. Connection between the L-shaped earth electrode and the Z-shaped connecting fitting can be fixed by bolt installation, that is one end of the Z-shaped connecting fitting sets a through-hole, one end of the L-shaped earth electrode is empty, and sets connecting screw thread inside, the bolt passes through the through-hole of the Z-shaped connecting fitting, then connects with the screw thread of the L-shaped earth electrode, such that the Z-shaped connecting fitting and the L-shaped earth electrode can be fixedly connected together easily and quickly.

Furthermore, the gas generating device comprises arc extinguishing gas capsule and gas capsule insulating base; a trigger electrode and a short circuit ring are located at the arc extinguishing gas capsule; a fixed electrode is located at a position of the gas capsule insulating base corresponding to the trigger electrode, and the fixed electrode is connected with an electrode of the thunder and lightning pulse acquisition device. The arc extinguishing gas capsule can be squeezed into the gas capsule insulating base via rubber ring, such that the arc extinguishing gas capsule can be fixedly installed inside the gas capsule insulating base and will not drop down. Several arc extinguishing gas projectiles can be put in the gas generating device, each of the arc extinguishing gas projectiles is comprised of corresponding arc extinguishing gas capsule and gas capsule insulating base, the specific quantity is decided by production situation.

The arc extinguishing gas capsule comprises a electricity and heat converting device and a solid gas generating material device; the electricity and heat converting device converts the electrical pulse transmitted from the thunder and lightning pulse acquisition device into heat energy; the solid gas generating material device generates a lot of gas on the condition of high temperature and high voltage.

The gas generating device of the grounding-side arc extinguishing device are arranged in a way of superposition in axial direction in the insulating sealing shell, and each of the gas generating devices comprises an embed sheet iron located inside the gas generating device; the insulating sealing shell of the grounding-side arc extinguishing device comprises a high yield magnet and a switch sheet metal located inside the insulating sealing shell; when an electric power transmission line is struck by lightning for the first time, a first gas generating device starts and does arc extinguishing, then automatically detaches from the grounding-side arc extinguishing device, a second gas generating device falls into a previous position of the first gas generating device, a third gas generating device falls into a previous position of the second gas generating device, the embed sheet iron of the second gas generating device is attracted by the high yield magnet, the trigger electrode of the second gas generating device connects with the electrode of the thunder and lightning pulse acquisition device reliably, one action of the arc extinguishing triggered by lightning is finished. The high field magnet attracts the embed sheet iron of the gas generating device, for strengthening the close contact between the trigger electrode of gas generating device and electrode of the thunder and lightning pulse acquisition device. The function of the switch sheet metal is supporting the gas generating device to some extent when the gas generating device does not start, and prevent it from falling or dropping; when the gas generating device starts, the switch sheet metal becomes out of balance immediately, the gas generating device falls into corresponding position.

A groove is defined on the insulating sealing shell, and the groove counteracts a recoil generated by the gas generating device when the gas generating device starts. The groove can not only counteract the recoil generated by the gas generating device when it starts, but also impel the gas generating device to fall down, detach from the grounding-side arc extinguishing device, and the next gas generating device enters the position and state of ready, for finishing the automatic replacement among the gas generating devices. The position of the groove can be set according to the configuration of the gas generating device, as long as the groove can effect to counteract the recoil generated by the gas generating device when it starts, usually the groove is set behind the gas generating device, if a projection is set on the middle or front of the hull of the gas generating device, then the groove can be set on a position where is corresponding to the projection, which position is on the insulating sealing shell.

More than one gas generating device are located in the grounding-side arc extinguishing device, and the front end of the gas generating device comprises corresponding digital mark. According to the digital mark, we can know how many times the device acts, that is we can know the remaining number of gas generating devices under the tower, so that we can replace and overhaul the device in time.

An internal metal arcing ring is located on a whiffing port of the arc extinguishing chamber, an outer ripple is located outside the arc extinguishing chamber. The internal metal arcing ring can almost completely guide the arc into the arc extinguishing chamber, the function of the internal metal arcing ring is to guide the arc and share the voltage. The function of the outer ripple is to increase the creepage distance and further reduce the incidence rate of error puncture.

The way in which the grounding-side fitting and/or the conducting wire-side fitting connect with the circuit insulator string adopts a configuration of double nuts. The configuration of double-nut can ensure the stable connection between the fitting and circuit insulator string, it will not be loosening, and has a ‘double insurance’ effect, that is in a case where the external nut is used long time or the external nut cannot fasten caused by the stress effect of connecting sheet of circuit insulator string, we can fasten the connection between the fitting and circuit insulator string via internal nut.

A jut is located at a surface at where a connecting sheet of the grounding-side fitting and/or the conducting wire-side fitting contact/contacts the circuit insulator string. The jut also can effect to make the grounding-side fitting and/or the conducting wire-side fitting firmly connect with the circuit insulator string, and prevent it from loosening and slipping. The jut is used to prevent the protecting gap from widening caused by climate change or aging and deformation of the fitting during the use, thereby losing the corresponding effect. The size of jut can be designed according to the different size of ball and wire clamp of the circuit insulator string.

A gas generating material pipe is located on the grounding-side fitting, and the gas generating material pipe is sleeved on an outer surface of the grounding-side fitting, a passive arc extinguishing gap and a whiffing hole are defined inside the gas generating material pipe.

An internal metal arcing ring is located on a whiffing port of the arc extinguishing chamber, an outer ripple is located outside the arc extinguishing chamber, and the tubular earth electrode and the conducting wire-side fitting collectively form a protecting gap.

The nonmetal conductive material used in the present invention is usually graphite.

The injecting direction of arc extinguishing gas capsule of the device appeared right in front the centre of arc column, such as to make the high speed arc extinguishing gas strongly effect on the centre of arc column both from the longitudinal direction and transverse direction, the arc extinguishing gas outward diffuses from the centre of arc, and making the arc extinguishing gas fully interacts with the arc. The longitudinal gas can make the arc far away from the tubular earth electrode which is made of nonmetal conductive material, and make insulation distance widen quickly; the transverse gas can extinguish the remaining arc ion; the arc extinguishing gas capsule injects high speed gas for driving arc to leave the arc extinguishing chamber, and making the arc extinguishing chamber into temporary vacuum, the insulation strength of vacuum is much more stronger than that of the air. Its compositive effect is to prevent the arc from rekindling, and successfully enlarge the area and efficiency of interaction between the arc extinguishing gas and arc.

The device also uses a configuration of passive arc extinguishing gap, the gas generating material pipe of passive arc extinguishing gap is made of the material which can generate electronegative gas in a condition of high temperature and high voltage. In a case where the arc extinguishing device is full of gas capsule, the function of passive gap is voltage-sharing, and reducing the recovery voltage of the break down inside gap; in a case where the follow-up power frequency arc is not able to extinguish initiatively when the arc extinguishing device runs out of gas capsules, the gas generating material pipe generates electronegative gas under the burning of arc, the electronegative gas expels the arc ion out of arc path via whiffing hole, reducing the ions of arc column and arc temperature, and also increasing the heat dissipation coefficient of the arc space, thus cutting off the arc passively, furthermore the whiffing holes can be expanded necessarily.

In the present invention, it also can set a hydrophobic fence outside the insulating sealing shell and arc extinguishing chamber, such to effectively prevent the flashover along the surface of insulating shell from happening on a rainy day.

According to the practice of overhead power transmission line in region where often occurs lightning in China, and doing many exploratory testing, the present invention designs a no-freewheeling arc lightning protection gap protecting device, which can be used on suspension insulator string (porcelain or glass) and strain insulator string of overhead power transmission line with any level of voltage, when the power transmission line is struck by lightning, the device not only can be punctured before the insulator string protected, but also can strongly weaken the great arc and the severe air current generated in restricted space can actively extinguish the arc, after the protecting device is punctured and the lightning current flows, the tubular earth electrode can make the arc column which is in the highest temperature disappears, and the gas of gas capsule effects on arc column, this greatly increases the efficiency of interact between gas and arc, achieving quickly eliminating lightning grounding fault and short circuit fault, the time due to the arc extinguishing is much shorter than that due to the operation of relay protection, thereby effectively ensure the reliability of power support.

The advantage of the present invention:

the present invention has obvious advantage when compared to the prior parallel connection gap or line-arrester, in a case where the line operates normally, it has no freewheeling; in a case where the line is struck by lightning and in a state of overvoltage, the protecting device can quickly start, guide the lightning current and extinguish arc reliability in the same time, and extinguish arc before the power transmission line operates relay protecting act, thereby avoid the trip-out from happening, and effectively protect the electric appliance, increase the reliability of power support; the protecting device can repeat the action, and the gas generating device can be replaced in a electriferous state; because of the time which arc lasts is very short, the electrode basically has no erosion, it can stably and chronically operate.

(1) Nonmetal conductive material tubular earth electrode can be made of nonmetal conductive material (for example conductive material of element C and element Si), it has cold cathode effect, and can restrain the energy of arc so as to extinguish arc. Certainly the tubular earth electrode also can be made of metal conductive material. Nonmetal conductive material tubular earth electrode, which is made of nonmetal conductive material, is used as one end to joint lightning arc, with its function, cylindrical arc will diffuse to the tubular earth electrode actively as soon as the lightning punctures the gap, making the high-temperature arc column disappears when it passes through the tubular earth electrode made of nonmetal conductive material, thereby effectively reduce temperature and degree of ionization of arc, and the arc extinguishing gas capsule strongly effect on the centre of arc column which does not disappear from longitudinal and transverse direction, the arc extinguishing gas outward diffuses from the centre of arc, and making the arc extinguishing gas fully interacts with the arc, successfully increase the area and efficiency of interaction between arc extinguishing gas and arc.

(2) The device also uses a configuration of passive arc extinguishing gap, the gas generating material pipe of passive arc extinguishing gap is made of the material which can generate electronegative gas in a condition of high temperature and high voltage. In a case where the arc extinguishing device is full of gas capsule, the function of passive gap is voltage-sharing, and reducing the recovery voltage of the break down inside gap; in a case where the follow-up power frequency arc is not able to extinguish initiatively when the arc extinguishing device runs out of gas capsules, the gas generating material pipe generates electronegative gas under the burning of arc, the electronegative gas expels the arc ion out of arc path via whiffing hole, reducing the ions of arc column and arc temperature, and also increasing the heat dissipation coefficient of the arc space, thus cutting off the arc passively, furthermore the whiffing holes can be expanded necessarily. Such to make the electrode of protection gap be burned by arc only in a short time and not easily be damaged. And it can prevent the line from being burned out by arc because of arc is extinguished successfully.

(3) The gas generating device inside the protecting device has digital mark, such that we can know the number of remaining gas generating devices under the tower, replace and overhaul the device in time.

(4) The present invention improves the connection relationship between arc extinguishing device and fitting, such that the arc extinguishing device can be replaced easily, and the efficiency of replacement is increased.

(5) The present invention can reduce the trip-out rate and accident rate of power system be struck by lightning, improve reliability of power system, prolong the service life of electric appliance, for example transformer and circuit breaker, greatly economize the cost of appliance and the cost of overhaul and maintenance of system.

REFERENCE SIGNS LIST

1—circuit insulator string, 2—grounding-side fitting, 3—connecting fine pipe, 4—Z-shaped connecting fitting, 5—insulating sealing shell, 6—gas generating device, 6-1—first gas generating device, 6-2—second gas generating device, 6-3—third gas generating device, 7—tubular earth electrode, 8—outer ripple, 9—internal metal arcing ring, 10—arc extinguishing chamber, 11—thunder and lightning pulse acquisition device, 12—L-shaped earth electrode, 13—conducting wire-side fitting, 14—embed sheet iron, 15—high field magnet, 16—switch sheet metal, 17—fixed electrode, 18—trigger electrode, 19—solid gas generating material device, 20—gas capsule insulating base, 21 electricity and heat converting device, 22—short circuit ring, 23—gas generating material pipe, 24—passive arc extinguishing gap, 25—whiffing hole, 26—nut, 27—groove, 28—jut.

DESCRIPTION OF EMBODIMENTS

Following will describe the present invention in detail with the reference of drawings.

Embodiment 1

Figure 1:
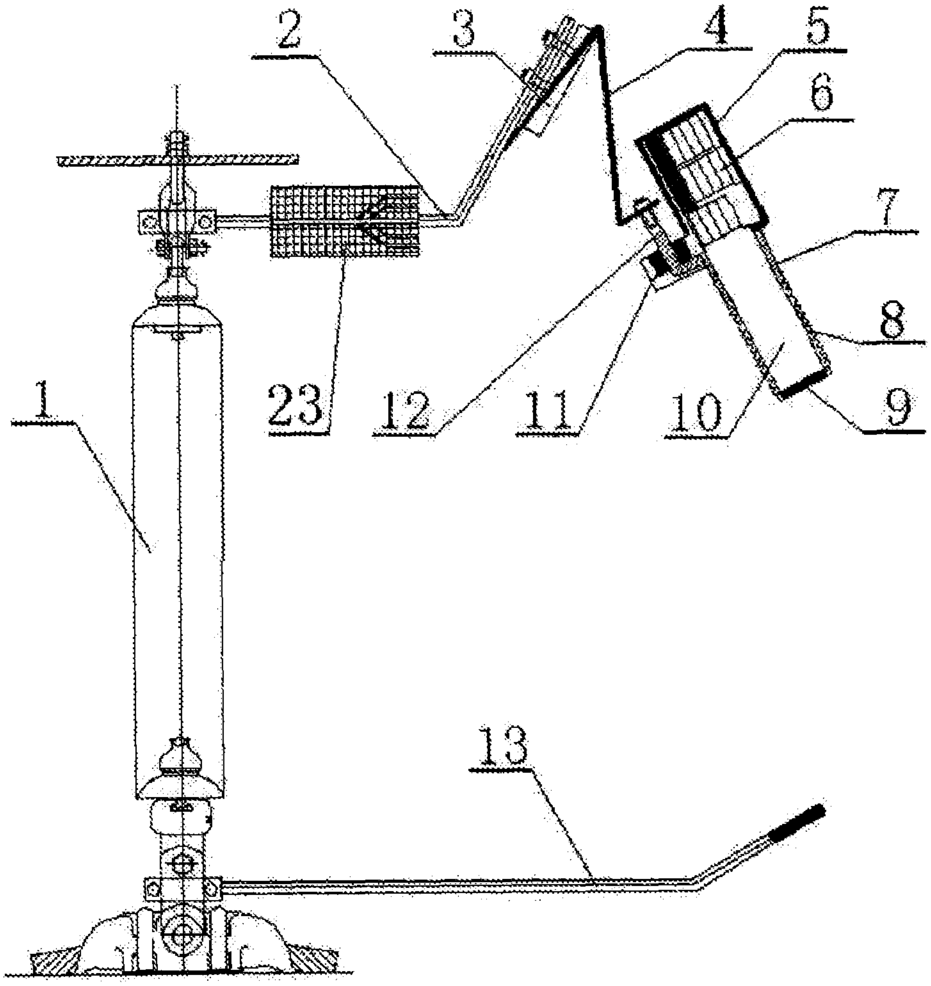
FIG. 1 is a view illustrating configuration of an embodiment of the present invention.

As illustrated in FIG. 1, a no-freewheeling arc lightning protection gap protecting device, comprising a grounding-side arc extinguishing device, a grounding-side fitting 2 and a conducting wire-side fitting 13, the grounding-side fitting 2 and the conducting wire-side fitting 13 being installed at two ends of a circuit insulator string 1, respectively, via fixing devices; the grounding-side arc extinguishing device being installed at one end of the grounding-side fitting 2; the grounding-side arc extinguishing device comprising a thunder and lightning pulse acquisition device 11, an insulating sealing shell 5, a gas generating device 6 and an arc extinguishing chamber 10, the gas generating device 6 is located inside the insulating sealing shell 5; the grounding-side arc extinguishing device further comprises a tubular earth electrode 7 made of nonmetal conductive material, one end of the tubular earth electrode 7 is internally embedded in the arc extinguishing chamber 10, the other end of the tubular earth electrode 7 is connected with the insulating sealing shell 5; the other end of the grounding-side fitting 2 is equipped with a connecting fine pipe 3; the grounding-side arc extinguishing device is inlaid in and connected with the connecting fine pipe 3 located on the grounding-side fitting 2 via a Z-shaped connecting fitting 4, the other end of the Z-shaped connecting fitting 4 is connected with the tubular earth electrode 7 via a connecting-line penetrating the thunder and lightning pulse acquisition device 11.

On the base of the above configuration, furthermore, the grounding-side arc extinguishing device further comprises a L-shaped earth electrode 12 made of nonmetal conductive material, one end of the L-shaped earth electrode 12 is connected with the Z-shaped connecting fitting 4, the other end of L-shaped earth electrode 12 penetrates the thunder and lightning pulse acquisition device 11 and is connected with the tubular earth electrode 7.

Figure 3:
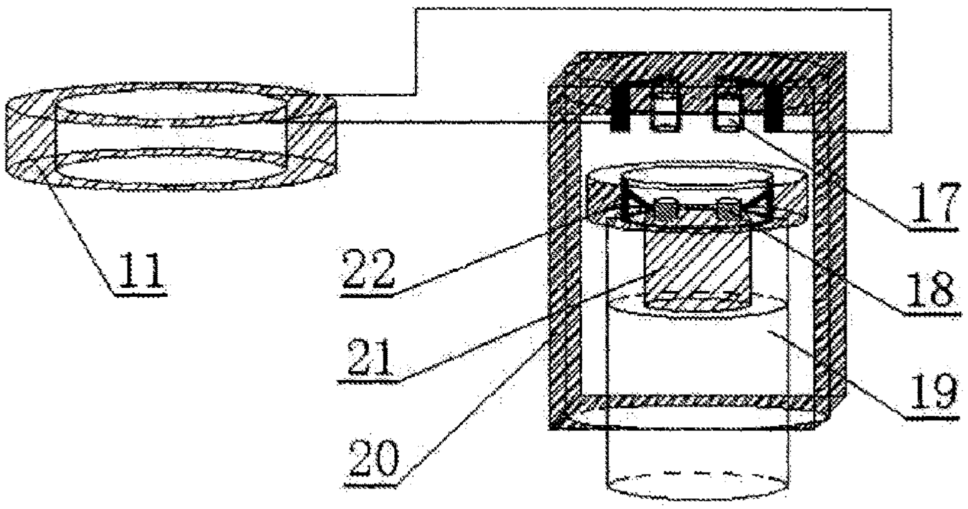
FIG. 3 is a view illustrating the internal configuration of gas generating device in accordance with an embodiment of the present invention.

As illustrated in FIG. 3, each of the gas generating device 6 has four arc extinguishing gas projectiles, each of the arc extinguishing gas projectiles comprises arc extinguishing gas capsule and gas capsule insulating base 20; a trigger electrode 18 and a short circuit ring 22 are located at the arc extinguishing gas capsule; a fixed electrode 17 is located at a position of the gas capsule insulating base 20 corresponding to the trigger electrode 18, and the fixed electrode 17 is connected with an electrode of the thunder and lightning pulse acquisition device 11; the arc extinguishing gas capsule comprises a electricity and heat converting device 21 and a solid gas generating material device 19; the electricity and heat converting device 21 converts the electrical pulse transmitted from the thunder and lightning pulse acquisition device 11 into heat energy; the solid gas generating material device 19 generates a lot of gas on the condition of high temperature and high voltage; a front end of the gas generating device 6 comprises a digital mark.

Figure 2:
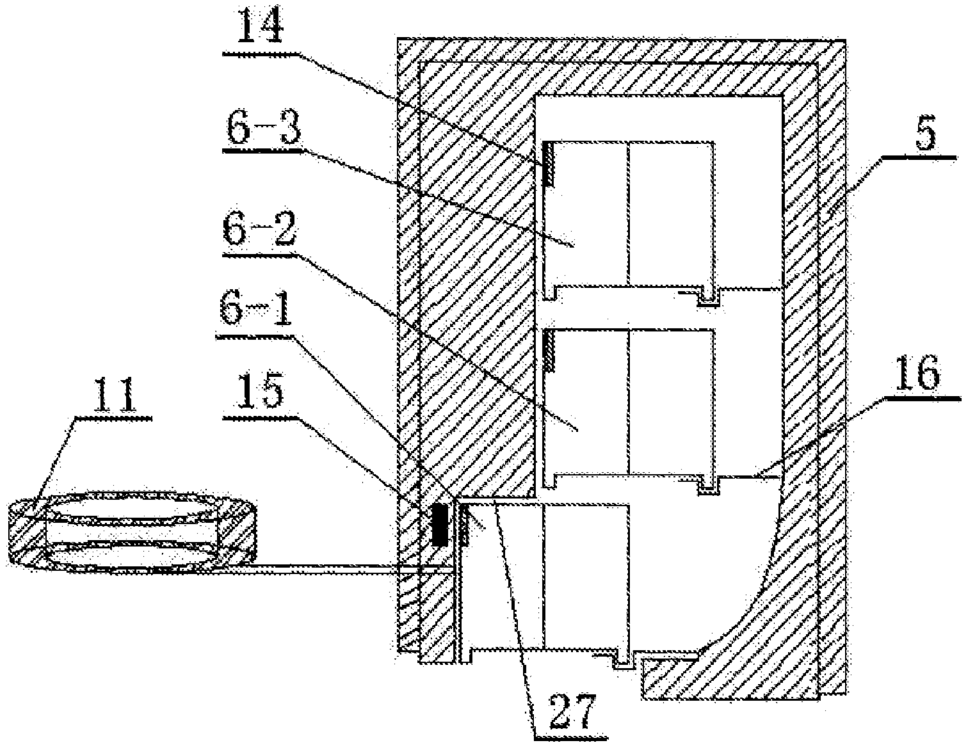
FIG. 2 is a view illustrating the arrangement of the gas generating device of the grounding-side arc extinguishing device in FIG. 1.

As illustrated in FIG. 2, the gas generating devices 6 of the grounding-side arc extinguishing device are arranged in a way of superposition in axial direction in the insulating sealing shell 5, and each of the gas generating devices 6 comprises an embed sheet iron 14 located inside the gas generating device 6; the insulating sealing shell 5 of the grounding-side arc extinguishing device comprises a high yield magnet 15 and a switch sheet metal 16 located inside the insulating sealing shell 5; when an electric power transmission line is struck by lightning for the first time, a first gas generating device 6-1 starts and does arc extinguishing, then automatically detaches from the grounding-side arc extinguishing device, a second gas generating device 6-2 falls into a previous position of the first gas generating device 6-1, a third gas generating device 6-3 falls into a previous position of the second gas generating device 6-2, the embed sheet iron 14 of the second gas generating device 6-2 is attracted by the high yield magnet 15, the trigger electrode 17 of the second gas generating device 6-2 connects with the electrode of the thunder and lightning pulse acquisition device 11 reliably, one action of the arc extinguishing triggered by lightning is finished. A right-angled groove 27 is defined on a position of the insulating sealing shell 5, which position is corresponding to the top left corner of the first gas generating device, and the groove 27 counteracts a recoil generated by the gas generating device 6 when the gas generating device 6 starts, makes the gas generating device drop down, detaches from the grounding-side arc extinguishing device, and the next gas generating device enters the position and state of ready, for finishing the automatic replacement among gas generating devices.

Figure 5:
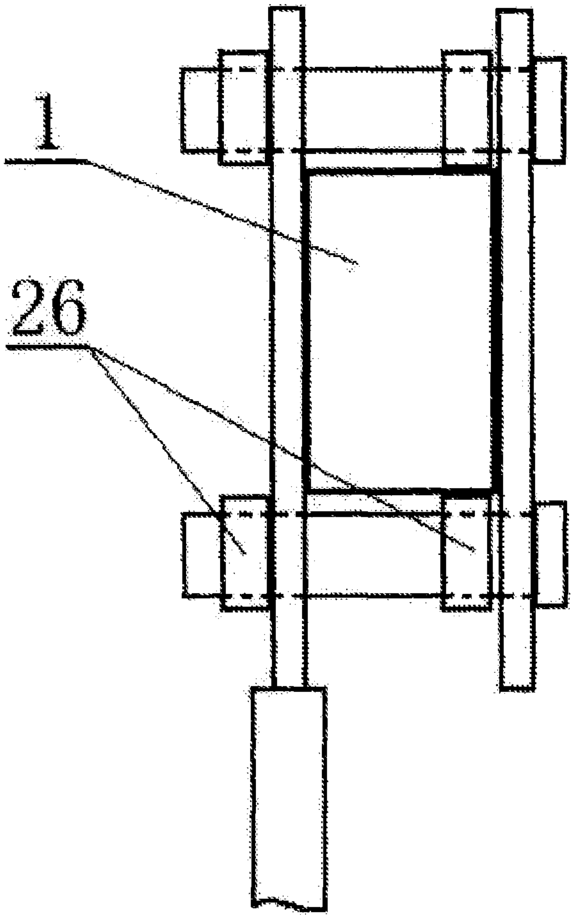
FIG. 5 is a view illustrating the connecting configuration of double-nut of the present invention.

An internal metal arcing ring 9 is located on a whiffing port of the arc extinguishing chamber 10, an outer ripple 8 is located outside the arc extinguishing chamber 10; the grounding-side fitting 2 connects with the circuit insulator string 1 by double nuts 26 as illustrated in FIG. 5; the tubular earth electrode 7, which is made of nonmetal conductive material, and the conducting wire-side fitting 13 collectively forms a protecting gap.

The present no-freewheeling arc lightning protection gap protecting device has obvious advantages when compared to the prior parallel connection gap or line-arrester, with the protection of the device there is no freewheeling when the line operates normally, when the line is struck by the lightning and overvoltage occurs, the protecting device can start rapidly, weaken the lightning current and extinguish arc reliably at the same time, and the arc is extinguished before the electric power transmission line starts relay protection, so as to avoid trip-out, further to protect the power appliance effectively, improve the reliability of electricity support; it is repeated and the gas generating device can be charged for replacement; because of the arc lasts so short that there is no erosion on electrode material, it can operate long time.

Embodiment 2

The difference between embodiment 2 and embodiment 1 shows following: the conducting wire-side fitting 13 connects with the circuit insulator string 1 by double nuts 26 (as illustrated in FIG. 5); the grounding-side fitting 2 connects with the circuit insulator string 1 by a common configuration.

Embodiment 3

The difference between embodiment 3 and embodiment 1 and 2 shows following: the grounding-side fitting 2 and/or the conducting wire-side fitting 13 connect/connects with the circuit insulator string 1 by double nuts 26 (as illustrated in FIG. 5).

Embodiment 4

Figure 6:
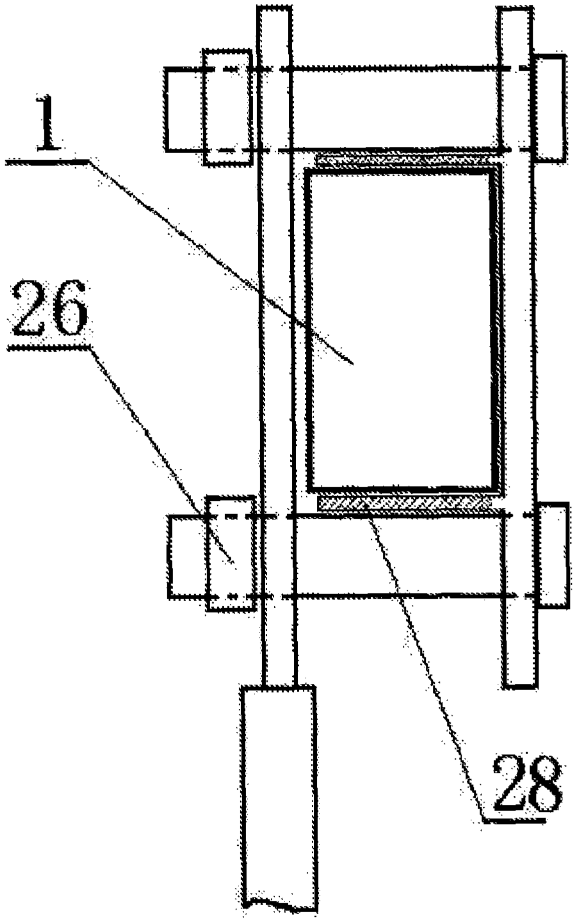
FIG. 6 is a view illustrating the connecting configuration of the jut of the present invention.

The difference between embodiment 4 and the above embodiment shows following: a jut 28 is located at a surface at where a connecting sheet of the grounding-side fitting 2 contacts the circuit insulator string 1 (as illustrated in FIG. 6); the conducting wire-side fitting 13 connects with the circuit insulator string 1 by a common configuration.

Embodiment 5

The difference between embodiment 5 and the above embodiment shows following: a jut 28 is located at a surface at where a connecting sheet of the conducting wire-side fitting 13 contacts the circuit insulator string 1 (as illustrated in FIG. 6); the grounding-side fitting 2 connects with the circuit insulator string 1 by a common configuration.

Embodiment 6

The difference between embodiment 6 and the above embodiment shows following: juts 28 are located at a surface at where a connecting sheet of the grounding-side fitting 2 and the conducting wire-side fitting 13 contacts the circuit insulator string 1 (as illustrated in FIG. 6).

Embodiment 7

Figure 4:
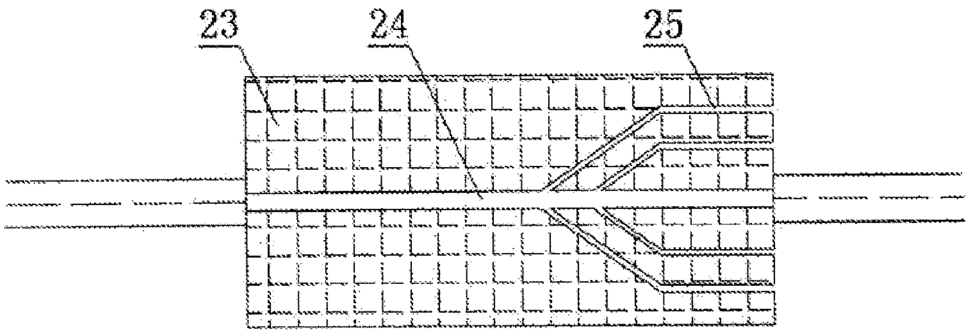
FIG. 4 is a view illustrating a fitting with configuration of passive arc extinguishing gap used in the present invention.

The improvement can be made on any one of the embodiments selected from embodiment 1 to 6 (as illustrated in FIG. 4), a gas generating material pipe 23 is located on the grounding-side fitting 2, and the gas generating material pipe 23 is sleeved on an outer surface of the grounding-side fitting 2, a passive arc extinguishing gap 24 and a whiffing hole 25 are defined inside the gas generating material pipe 23.

Besides the above embodiments, the connecting way of double nuts 26 configuration and the way that locates juts on connecting sheet can be mixed in use, the specific examples will not be given here.

The invention claimed is:

1. A no-freewheeling arc lightning protection gap protecting device, comprising a grounding-side are extinguishing device, a grounding-side fitting (2) and a conducting wire-side fitting (13), the grounding-side fitting (2) and the conducting wire-side fitting (13) being installed at two ends of a circuit insulator string (1), respectively, via fixing devices; the wounding-side arc extinguishing device being installed at one end of the grounding-side fitting (2); the grounding-side arc extinguishing device comprising a thunder and lightning pulse acquisition device (11), an insulating sealing shell (5), a gas generating device (6) and an arc extinguishing chamber (10), the gas generating device (6) being located inside the insulating sealing shell (5); wherein the grounding-side arc extinguishing device further comprises a tubular earth electrode (7) made of nonmetal conductive material, one end of the tubular earth electrode (7) is internally embedded in the arc extinguishing chamber (10), the other end of the tubular earth electrode (7) is connected with the insulating sealing shell (5); the one end of the grounding-side fitting (2) is equipped with a connecting fine pipe (3); the grounding-side arc extinguishing device is inlaid in and connected with the connecting fine pipe (3) located on the grounding-side fitting (2) via a Z-shaped connecting fitting (4), the other end of the Z-shaped connecting fitting (4) is connected with the tubular earth electrode (7) via a connecting-line penetrating the thunder and lightning pulse acquisition device (11).

2. The no-freewheeling arc lightning protection gap protecting device as set forth in claim 1, wherein the grounding-side arc extinguishing device further comprises a L-shaped earth electrode (12) made of nonmetal conductive material, one end of the L-shaped earth electrode (12) is connected with the Z-shaped connecting fitting (4), the other end of L-shaped earth electrode (12) penetrates the thunder and lightning pulse acquisition device (11) and is connected with the tubular earth electrode (7).

3. The no-freewheeling arc lightning protection gap protecting device as set forth in claim 1, wherein the gas generating device (6) comprises an arc extinguishing gas capsule and a gas capsule insulating base (20); a trigger electrode (18) and a short circuit ring (22) are located at the arc extinguishing gas capsule; a fixed electrode (17) is located at a position of the gas capsule insulating base (20) corresponding to the trigger electrode (18), and the fixed electrode (17) is connected with an electrode of the thunder and lightning pulse acquisition device (11).

4. The no-freewheeling arc lightning protection gap protecting device as set forth in claim 3, wherein the arc extinguishing gas capsule comprises a electricity and heat converting device (21) and a solid gas generating material device (19); the electricity and heat converting device (21) converts the electrical pulse transmitted from the thunder and lightning pulse acquisition device (11) into heat energy; the solid gas generating material device (19) generates a lot of gas on the condition of high temperature and high voltage.

5. The no-freewheeling arc lightning protection gap protecting device as set forth in claim 1, wherein the gas generating devices (6) of the grounding-side arc extinguishing device are arranged in a way of superposition in axial direction in the insulating sealing shell (5), and each of the gas generating devices (6) comprises an embed sheet iron (14) located inside the gas generating device (6); the insulating sealing shell (5) of the grounding-side are extinguishing device comprises a high yield magnet (15) and a switch sheet metal (16) located inside the insulating sealing shell (5); when an electric power transmission line is struck by lightning for the first time, a first gas generating device (6-1) starts and does arc extinguishing, then automatically detaches from the grounding-side arc extinguishing device, a second gas generating device (6-2) falls into a previous position of the first gas generating device (6-1), a third gas generating device (6-3) falls into a previous position of the second gas generating device (6-2), the embed sheet iron (14) of the second gas generating device (6-2) is attracted by the high yield magnet (15), the trigger electrode (18) of the second gas generating device (6-2) connects with the electrode of the thunder and lightning pulse acquisition device (11) reliably, one action of the arc extinguishing triggered by lightning is finished.

6. The no-freewheeling arc lightning protection gap protecting device as set forth in claim 5, wherein a groove (27) is defined on the insulating sealing shell (5), and the groove (27) counteracts a recoil generated by the gas generating device (6) when the gas generating device (6) starts.

7. The no-freewheeling arc lightning protection gap protecting device as set forth in claim 5, wherein more than one gas generating device (6) are located in the grounding-side arc extinguishing device, and a front end of the gas generating device (6) comprises a digital mark.

8. The no-freewheeling arc lightning protection gap protecting device as set forth in claim 1, wherein the grounding-side fitting (2) and/or the conducting wire-side fitting (13) connect/connects with the circuit insulator string (1) by double nuts (26).

9. The no-freewheeling arc lightning protection gap protecting device as set forth in claim 1, wherein a jut (28) is located at a surface at where a connecting sheet of the grounding-side fitting (2) and/or the conducting wire-side fitting (13) contacts the circuit insulator string (1).

10. The no-freewheeling arc lightning protection gap protecting device as set forth in claim 1, wherein a gas generating material pipe (23) is located on the grounding-side fitting (2), and the gas generating material pipe (23) is sleeved on an outer surface, of the grounding-side fitting (2), a passive arc extinguishing gap (24) and a whiffing hole (25) are defined inside the gas generating material pipe (23).

11. The no-freewheeling arc lightning protection gap protecting device as set forth in claim 1, wherein an internal metal arcing ring (9) is located on a whiffing port of the arc extinguishing chamber (10), an outer ripple (8) is located outside the arc extinguishing chamber (10), and the tubular earth electrode (7) and the conducting wire-side fitting (13) collectively form a protecting gap.

12. The no-freewheeling arc lightning protection gap protecting device as set forth in claim 2, wherein the gas generating device (6) comprises an arc extinguishing gas capsule and a gas capsule insulating base (20); a trigger electrode (18) and a short circuit ring (22) are located at the arc extinguishing gas capsule; a fixed electrode (17) is located at a position of the gas capsule insulating base (20) corresponding to the trigger electrode (18), and the fixed electrode (17) is connected with an electrode of the thunder and lightning pulse acquisition device (11).

13. The no-freewheeling arc lightning protection gap protecting device as set forth in claim 12, wherein the arc extinguishing gas capsule comprises a electricity and heat converting device (21) and a solid gas generating material device (19); the electricity and heat converting device (21) converts the electrical pulse transmitted from the thunder and lightning pulse acquisition device (11) into heat energy; the solid gas generating material device (19) generates a lot of gas on the condition of high temperature and high voltage.

14. The no-freewheeling arc lightning protection gap protecting device as set forth in claim 2, wherein the gas generating devices (6) of the grounding-side arc extinguishing device are arranged in a way of superposition in axial direction in the insulating sealing shell (5), and each of the gas generating devices (6) comprises an embed sheet iron (14) located inside the gas generating device (6); the insulating sealing shell (5) of the grounding-side arc extinguishing device comprises a high yield magnet (15) and a switch sheet metal (16) located inside the insulating sealing shell (5); when an electric power transmission line is struck by lightning for the first time, a first gas generating device (6-1) starts and does arc extinguishing, then automatically detaches from the grounding-side arc extinguishing device, a second gas generating device (6-2) falls into a previous position of the first gas generating device (6-1), a third gas generating device (6-3) falls into a previous position of the second gas, generating device (6-2), the embed sheet iron (14) of the second gas generating device (6-2) is attracted by the high yield magnet (15), the trigger electrode (18) of the second gas generating device (6-2) connects with the electrode of the thunder and lightning pulse acquisition device (11) reliably, one action of the arc extinguishing triggered by lightning is finished.

15. The no-freewheeling arc lightning protection gap protecting device as set forth in claim 4, wherein the gas generating devices (6) of the grounding-side arc extinguishing device are arranged in away of superposition in axial direction in the insulating sealing shell (5), and each of the gas generating devices (6) comprises an embed sheet iron (14) located inside the gas generating device (6); the insulating sealing shell (5) of the grounding-side are extinguishing device comprises a high yield magnet (15) and a switch sheet metal (16) located inside the insulating sealing shell (5); when an electric power transmission line is struck by lighting for the first time, a first gas generating device (6-1) starts and does arc extinguishing, then automatically detaches from the grounding-side arc extinguishing device, a second gas generating device (6-2) falls into a previous position of the first gas generating device (6-1), a third gas generating device (6-3) falls into a previous position of the second gas generating device (6-2), the embed sheet iron (14) of the second gas generating device (6-2) is attracted by the high yield magnet (15), the trigger electrode (18) of the second gas generating device (6-2) connects with the electrode of the thunder and lightning pulse acquisition device (11) reliably, one action of the arc extinguishing triggered by lightning is finished.

16. The no-freewheeling arc lightning protection gap protecting device as set forth in claim 13, wherein the gas generating devices (6) of the grounding-side arc extinguishing device are arranged in a way of superposition in axial direction in the insulating sealing shell (5), and each of the gas generating devices (6) comprises an embed sheet iron (14) located inside the gas generating device (6); the insulating sealing shell (5) of the grounding-side arc extinguishing device comprises a high yield magnet (15) and a switch sheet metal (16) located inside the insulating sealing shell (5); when an electric power transmission line is struck by lightning for the first time, a first gas generating device (6-1) starts and does arc extinguishing, then automatically detaches from the grounding-side arc extinguishing device, a second gas generating device (6-2) falls into a previous position of the first gas generating device (6-1), a third gas generating device (6-3) falls into a previous position of the second gas generating device (6-2), the embed sheet iron (14) of the second gas generating device (6-2) is attracted by the high yield magnet (15), the trigger electrode (18) of the second gas generating device (6-2) connects with the electrode of the thunder and lightning pulse acquisition device (11) reliably, one action of the arc extinguishing triggered by lightning is finished.

17. The no-freewheeling am lightning protection gap protecting device as set forth in claim 14, wherein a groove (27) is defined on the insulating sealing shell (5), and the groove (27) counteracts a recoil generated by the gas generating device (6) when the gas generating device (6) starts.

18. The no-freewheeling arc lightning protection gap protecting device as set forth in claim 15, wherein a groove (27) is defined on the insulating sealing shell (5), and the groove (27) counteracts a recoil generated by the gas generating device (6) when the gas generating device (6) starts.

19. The no-freewheeling arc lightning protection gap protecting device as set forth in claim 16, wherein a groove (27) is defined on the insulating sealing shell (5), and the groove (27) counteracts a recoil generated by the gas generating device (6) when the gas generating device (6) starts.

20. The no-freewheeling arc lightning protection gap protecting device as set forth in claim 14, wherein more than one gas generating device (6) are located in the grounding-side arc extinguishing device, and a front end of the gas generating device (6) comprises a digital mark.

21. The no-freewheeling arc lightning protection gap protecting device as set forth in claim 15, wherein more than one gas generating device (6) are located in the grounding-side arc extinguishing device, and a front end of the gas generating device (6) comprises a digital mark.

22. The no-freewheeling, arc lightning protection gap protecting device as set forth in claim 16, wherein more than one gas generating device (6) are located in the grounding-side arc extinguishing device, and a front end of the gas generating device (6) comprises a digital mark.

23. The no-freewheeling arc lightning protection gap protecting device as set forth in claim 2, wherein the grounding-side fitting (2) and/or the conducting wire-side fitting (13) connect/connects with the circuit insulator string (1) by double nuts (26).

24. The no-freewheeling arc lightning protection gap protecting device as set forth in claim 4, wherein the grounding-side fitting (2) and/or the conducting wire-side fitting (13) connect/connects with the circuit insulator string (1) by double nuts (26).

25. The no-freewheeling arc lightning protection gap protecting device as set forth in claim 13, wherein the grounding-side fitting (2) and/or the conducting wire-side fitting (13) connect/connects with the circuit insulator string (1) by double nuts (26).

26. The no-freewheeling arc lightning protection gap protecting device as set forth in claim 6, wherein the grounding-side fitting (2) and/or the conducting wire-side fitting (13) connect/connects with the circuit insulator string (1) by double nuts (26).

27. The no-freewheeling arc lightning protection gap protecting device as set forth in claim 17, wherein the grounding-side fitting (2) and/or the conducting wire-side fitting (13) connect/connects with the circuit insulator string (1) by double nuts (26).

28. The no-freewheeling arc lightning protection gap protecting device as set forth in claim 18, wherein the grounding-side fitting (2) and/or the conducting wire-side fitting (13) connect/connects with the circuit insulator string (1) by double nuts (26).

29. The no-freewheeling arc lightning protection gap protecting device as set forth in claim 19, wherein the grounding-side fitting (2) and/or the conducting wire-side fitting (13) connect/connects with the circuit insulator string (1) by double nuts (26).

30. The no-freewheeling arc lightning protection gap protecting device as set forth in claim 7, wherein the grounding-side fitting (2) and/or the conducting wire-side fitting (13) connect/connects with the circuit insulator string (1) by double nuts (26).

31. The no-freewheeling arc lightning protection gap protecting device as set forth in claim 20, wherein the grounding-side fitting (2) and/or the conducting wire-side fitting (13) connect/connects with the circuit insulator string (1) by double nuts (26).

32. The no-freewheeling arc lightning protection gap protecting device as set forth in claim 21, wherein the grounding-side fitting (2) and/or the conducting wire-side fitting (13) connect/connects with the circuit insulator string (1) by double nuts (26).

33. The no-freewheeling arc lightning protection gap protecting device as set forth in claim 22, wherein the grounding-side fitting (2) and/or the conducting wire-side fitting (13) connect/connects with the circuit insulator string (1) by double nuts (26).

34. The no-freewheeling arc lightning protection gap protecting device as set forth in claim 2, wherein a jut (28) is located at a surface at where a connecting sheet of the grounding-side fitting (2) and/or the conducting wire-side fitting (13) contacts the circuit insulator string (1).

35. The no-freewheeling arc lightning protection gap protecting device as set forth in claim 4; wherein a jut (28) is located at a surface at where a connecting sheet of the grounding-side fitting (2) and/or the conducting wire-side fitting (13) contacts the circuit insulator sting (1).

36. The no-freewheeling arc lightning protection gap protecting device as set forth in claim 13, wherein a jut (28) is located at a surface at where a connecting sheet of the grounding-side fitting (2) and/or the conducting wire-side fitting (13) contacts the circuit insulator string (1).

37. The no-freewheeling arc lightning protection gap protecting device as set forth in claim 6, wherein a jut (28) is located at a surface at where a connecting sheet of the grounding-side fitting (2) and/or the conducting wire-side fitting (13) contacts the circuit insulator string (1).

38. The no-freewheeling arc lightning protection gap protecting device as set forth in claim 17, wherein a jut (28) is located at a surface at where a connecting sheet of the grounding-side fitting (2) and/or the conducting wire-side fitting (13) contacts the circuit insulator string (1).

39. The no-freewheeling arc lightning protection gap protecting device as set forth in claim 18, wherein a jut (28) is located at a surface at where a connecting sheet of the grounding-side fitting (2) and/or the conducting wire-side fitting (13) contacts the circuit insulator string (1).

40. The no-freewheeling arc lightning protection gap protecting device as set forth in claim 19, wherein a jut (28) is located at a surface at where a connecting sheet of the grounding-side fitting (2) and/or the conducting wire-side fitting (13) contacts the circuit insulator string (1).

41. The no-freewheeling arc lightning protection gap protecting device as set forth in claim 7, wherein a jut (28) is located at a surface at where a connecting sheet of the grounding-side fitting (2) and/or the conducting wire-side fitting (13) contacts the circuit insulator string (1).

42. The no-freewheeling are lightning protection gap protecting device as set forth in claim 20, wherein a jut (28) is located at a surface at where a connecting sheet of the grounding-side fitting (2) and/or the conducting wire-side fitting (13) contacts the circuit insulator string (1).

43. The no-freewheeling arc lightning protection gap protecting device as set forth in claim 21, wherein a jut (28) is located at a surface at where a connecting sheet of the grounding-side fitting (2) and/or the conducting wire-side fitting (13) contacts the circuit insulator string (1).

44. The no-freewheeling arc lightning protection gap protecting device as set forth in claim 22, wherein a jut (28) is located at a surface at where a connecting sheet of the grounding-side fitting (2) and/or the conducting wire-side fitting (13) contacts the circuit insulator string (1).

45. The no-freewheeling arc lightning protection gap protecting device as set forth in claim 2, wherein a gas generating material pipe (23) is located on the grounding-side fitting (2), and the gas generating material pipe (23) is sleeved on an outer surface of the grounding-side fitting (2), a passive arc extinguishing gap (24) and a whiffing hole (25) are defined inside the gas generating material pipe (23).

46. The no-freewheeling arc lightning protection gap protecting device as set forth in claim 4, wherein a gas generating material pipe (23) is located on the grounding-side fitting (2), and the gas generating material pipe (23) is sleeved on an outer surface of the grounding-side fitting (2), a passive arc extinguishing gap (24) and a whiffing hole (25) are defined inside the gas generating material pipe (23).

47. The no-freewheeling arc lightning protection gap protecting device as set forth in claim 13, wherein a gas generating material pipe (23) is located on the grounding-side fitting (2), and the gas generating material pipe (23) is sleeved on an outer surface of the grounding-side fitting (2), a passive are extinguishing gap (24) and a whiffing hole (25) are defined inside the gas generating material pipe (23).

48. The no-freewheeling arc lightning protection gap protecting device as set forth in claim 6, wherein a gas generating material pipe (23) is located on the grounding-side fitting (2), and the gas generating material pipe (23) is sleeved on an outer surface of the grounding-side fitting (2), a passive arc extinguishing gap (24) and a whiffing hole (25) are defined inside the gas generating material pipe (23).

49. The no-freewheeling are lightning protection gap protecting device as set forth in claim 17, wherein a gas generating material pipe (23) is located on the grounding-side fitting (2), and the gas generating material pipe (23) is sleeved on an outer surface of the grounding-side fitting (2), a passive arc extinguishing gap (24) and a whiffing hole (25) are defined inside the gas generating material pipe (23).

50. The no-freewheeling arc lightning protection gap protecting device as set forth in claim 18, wherein a gas generating material pipe (23) is located on the grounding-side fitting (2), and the gas generating material pipe (23) is sleeved on an outer surface of the grounding-side fitting (2), a passive arc extinguishing gap (24) and a whiffing hole (25) are defined inside the gas generating material pipe (23).

51. The no-freewheeling arc lightning protection gap protecting device as set forth in claim 19, wherein a gas generating material pipe (23) is located on the grounding-side fitting (2), and the gas generating material pipe (23) is sleeved on an outer surface of the grounding-side fitting (2), a passive arc extinguishing gap (24) and a whiffing hole (25) are defined inside the gas generating material pipe (23).

52. The no-freewheeling arc lightning protection gap protecting device as set forth in claim 7, wherein a gas generating material pipe (23) is located on the grounding-side fitting (2), and the gas generating material pipe (23) is sleeved on an outer surface of the grounding-side fitting (2), a passive arc extinguishing gap (24) and a whiffing hole (25) are defined inside the gas generating material pipe (23).

53. The no-freewheeling arc lightning protection gap protecting device as set forth in claim 20, wherein a gas generating material pipe (23) is located on the grounding-side fitting (2), and the gas generating material pipe (23) is sleeved on an outer surface of the grounding-side fitting (2), a passive arc extinguishing gap (24) and a whiffing hole (25) are defined inside the gas generating material pipe (23).

54. The no-freewheeling arc lightning protection gap protecting device as set forth in claim 21, wherein a gas generating material pipe (23) is located on the grounding-side fitting (2), and the gas generating material pipe (23) is sleeved on an outer surface of the grounding-side fitting (2), a passive arc extinguishing gap (24) and a whiffing hole (25) are defined inside the gas generating material pipe (23).

55. The no-freewheeling arc lightning protection gap protecting device as set forth in claim 22, wherein a gas generating material pipe (23) is located on the grounding-side fitting (2), and the gas generating material pipe (23) is sleeved on an outer surface of the grounding-side fitting (2), a passive arc extinguishing gap (24) and a whiffing hole (25) are defined inside the gas generating material pipe (23).

56. The no-freewheeling arc lightning protection gap protecting device as set forth in claim 2, wherein an internal metal arcing ring (9) is located on a whiffing port of the arc extinguishing chamber (10), an outer ripple (8) is located outside the arc extinguishing chamber (10), and the tubular earth electrode (7) and the conducting wire-side fitting (13) collectively form a protecting gap.

57. The no-freewheeling arc lightning protection gap protecting device as set forth in claim 4, wherein an internal metal arcing ring (9) is located on a whiffing port of the arc extinguishing chamber (10), an outer ripple (8) is located outside the arc extinguishing chamber (10), and the tubular earth electrode (7) and the conducting wire-side fitting (13) collectively form a protecting gap.

58. The no-freewheeling arc lightning protection gap protecting device as set forth in claim 13, wherein an internal metal arcing ring (9) is located on a whiffing port of the arc extinguishing chamber (10), an outer ripple (8) is located outside the arc extinguishing chamber (10), and the tubular earth electrode (7) and the conducting wire-side fitting (13) collectively form a protecting gap.

59. The no-freewheeling arc lightning protection gap protecting device as set forth in claim 6, wherein an internal metal arcing ring (9) is located on a whiffing port of the arc extinguishing chamber (10), an outer ripple (8) is located outside the arc extinguishing chamber (10), and the tubular earth electrode (7) and the conducting wire-side fitting (13) collectively form a protecting gap.

60. The no-freewheeling arc lightning protection gap protecting device as set forth in claim 17, wherein an internal metal arcing ring (9) is located on a whiffing port of the arc extinguishing chamber (10), an outer ripple (8) is located outside the arc extinguishing chamber (10), and the tubular earth electrode (7) and the conducting wire-side fitting (13) collectively form a protecting gap.

61. The no-freewheeling arc lightning protection gap protecting device as set forth in claim 18, wherein an internal metal arcing ring (9) is located on a whiffing port of the arc extinguishing chamber (10), an outer ripple (8) is located outside the arc extinguishing chamber (10), and the tubular earth electrode (7) and the conducting wire-side fitting (13) collectively form a protecting gap.

62. The no-freewheeling arc lightning protection gap protecting device as set forth in claim 19, wherein an internal metal arcing ring (9) is located on a whiffing port of the arc extinguishing chamber (10), an outer ripple (8) is located outside the arc extinguishing chamber (10), and the tubular earth electrode (7) and the conducting wire-side fitting (13) collectively form a protecting gap.

63. The no-freewheeling arc lightning protection gap protecting device as set forth in claim 7, wherein an internal metal arcing ring (9) is located on a whiffing port of the arc extinguishing chamber (10), an outer ripple (8) is located outside the are extinguishing chamber (10), and the tubular earth electrode (7) and the conducting wire-side fitting (13) collectively form a protecting gap.

64. The no-freewheeling arc lightning protection gap protecting device as set forth in claim 20, wherein an internal metal arcing ring (9) is located on a whiffing port of the arc extinguishing chamber (10), an outer ripple (8) is located outside the are extinguishing chamber (10), and the tubular earth electrode (7) and the conducting wire-side fitting (13) collectively form a protecting gap.

65. The no-freewheeling arc lightning protection gap protecting device as set forth in claim 21, wherein an internal metal arcing ring (9) is located on a whiffing port of the arc extinguishing chamber (10), an outer ripple (8) is located outside the arc extinguishing chamber (10), and the tubular earth electrode (7) and the conducting wire-side fitting (13) collectively form a protecting gap.

66. The no-freewheeling arc lightning protection gap protecting device as set forth in claim 22, wherein an internal metal arcing ring (9) is located on a whiffing port of the arc extinguishing chamber (10), an outer ripple (8) is located outside the are extinguishing chamber (10), and the tubular earth electrode (7) and the conducting wire-side fitting (13) collectively form a protecting gap.

* * * * *